Dec. 15, 1936.                W. C. CALVERT                2,064,780
                              PRINTER'S BLANKET
                              Filed Aug. 18, 1933
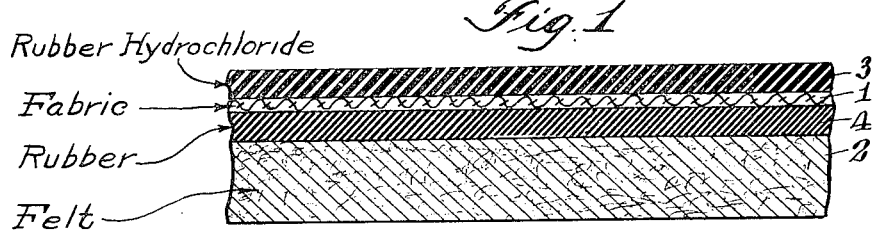
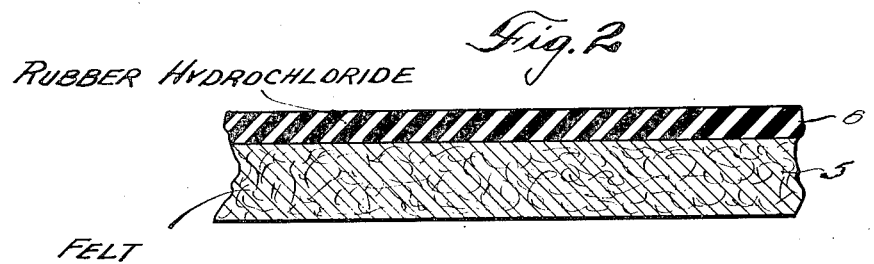
Inventor
William C. Calvert
Attorney Patented Dec. 15, 1936

2,064,780

UNITED STATES PATENT OFFICE 2,064,780

PRINTER'S BLANKET

William C. Calvert, Cuyahoga Falls, Ohio, assignor to Wingfoot Corporation, Wilmington, Del., a corporation of Delaware Application August 18, 1933, Serial No. 685,723

10 Claims. (Cl. 154—54.5)

This invention relates to printer's blankets which comprise a film of a rubber hydrohalide to protect the rubber. More particularly the invention relates to printer's blankets which comprise rubber, have a felt base and an outer coating of a partially saturated rubber hydrochloride.

Printer's blankets are used on the pressure rolls of a printing press and provide a resilient surface to be pressed against the type plate. Because of the irregularities in the type plate the printer's blanket must be soft and resilient. Both rubber and felt, separately and in combination, have long been used to provide the desired cushioning effect. Rubber has been used both in the form of a sheet and in the form of a cement to bind different layers of a composite blanket together. Oils and greases are soluble in rubber and unless printer's blankets which contain rubber are oil-proofed in some way the oils present in the ink used, or oil used for lubrication, on coming in contact with the rubber will cause it to swell, and an uneven surface will be produced. To prevent this the rubber in the blankets of this invention is protected by a rubber hydrohalide film or coating.

A printer's blanket made solely of felt, or a composite blanket with an outer surface of felt would be quite unsatisfactory because the felt would absorb the ink and offset. A satisfactory blanket, however, may be formed by coating felt with a flexible rubber hydrochloride, or a composite blanket having a felt surface may be improved by coating it with a flexible rubber hydrochloride.

In the drawing two specific examples of the invention are shown in Figs. 1 and 2 as described below.

A preferred form of the invention shown in Fig. 1 consists of a blanket formed by building up a layer of a sulfur-containing rubber cement on one side of both a fine cotton fabric, 1, and a felt backing, 2, uniting the cotton and felt by pressing the cemented surfaces together and then after curing, applying an oilproof coating of rubber hydrochloride, 3, to the exposed surface of the cotton fabric. The cured cement is indicated at 4. Such a printer's blanket is resilient and will have long life due to the protection afforded by the coating of the rubber hydrohalide.

A printer's blanket made solely of felt with a rubber hydrochloride surface is shown in Fig. 2. The felt 5 is protected by the rubber hydrochloride coating 6. This coating is oil-proof and prevents oil, ink, etc. from being absorbed by the felt and then off-setting.

The oilproof coating must be flexible and of such a nature that it will withstand the constant flexing caused by pressure against an ever-changing type surface. This coating is advantageously formed by applying to the upper surface of the blanket several coatings of a solution of a partially saturated rubber hydrochloride in a suitable solvent such as benzene or chloroform. After one coating has been applied the solvent is allowed to evaporate and then another layer of coating is applied and in this way by several applications of a rubber hydrochloride solution a durable coating which may be several thousandths or hundredths of an inch thick is formed.

Rubber hydrohalides are advantageously formed by treating a solution of rubber in a suitable solvent, such as benzene, with a halogen acid gas such as hydrochloric acid or hydrobromic acid gas, or the rubber hydrohalide may be formed by dissolving the rubber in a solvent, such as benzene, which has previously been saturated with hydrochloric acid or other halogen acid. Rubber hydrohalides have very different properties from rubber. One difference is the fact that rubber itself is attacked by oils and swells or dissolves in oils. Rubber hydrohalides on the other hand are oil resistant.

Rubber reacts with different amounts of the halogen acids. Rubber, which is saturated with hydrogen chloride, is brittle and therefore unsatisfactory for coating printer's blankets unless fluxed with a suitable softener. According to the preferred form of this invention a partially saturated rubber hydrochloride is employed as the coating. Rubber hydrochlorides which are only partially saturated and contain 28–30.5% chlorine or somewhat less chlorine down to about 27% are flexible and may satisfactorily be employed for coating printer's blankets. Rubber hydrochlorides containing less than about 27% chlorine are tacky and unsuitable for this use.

The partially saturated rubber hydrochloride may be formed by dissolving 20 parts of plasticized pale crepe rubber in 313 pounds of benzene. This cement is preferably cooled to about 10° C. and hydrogen chloride gas is introduced for about six hours or until the increase in weight of the composition due to the introduction of hydrogen chloride amounts to approximately 11.6 pounds which corresponds to a slight excess of hydrogen chloride over that theoretically required for saturation of the rubber. The addition of hydrogen chloride may then be discontinued and the cement allowed to react at room temperature until a washed and dried sample indicates that the desired reaction has taken place. The samples may be tested for chlorine content or a trained observer may determine the extent of the hydrochlorination by mere visual and manual examination of the film formed on drying a sample of the cement. The film should be non-tacky and flexible. Generally the time required for the formation of a rubber hydrochloride containing about 30% chlorine is in the neighborhood of 20 hours.

After the hydrochlorination has proceeded to a point where a rubber hydrochloride of the desired chlorine content has been produced, the cement is subjected to steam distillation to remove the excess hydrogen chloride and the solvent. The solid rubber hydrogen chloride thus obtained is washed on a rubber mill with water to remove traces of hydrochloric acid and water soluble materials. The purified rubber hydrochloride is then dissolved in a suitable solvent, such as chloroform or benzene, etc. The amount of solvent added will depend upon how the rubber hydrochloride is to be applied to the printer's blanket. A smaller amount of solvent will be used where a viscous cement is desired and a larger amount of solvent where a less viscous cement is wanted.

It is advantageous to stabilize the rubber hydrochloride coating by the incorporation of a suitable age-resister. The age-resister is advantageously added to the solution of the purified rubber hydrochloride. One-half of one per cent of hexamethylene tetramine (based on the weight of the rubber hydrochloride) has given very satisfactory results. Other age-resisters which may be employed include dicyclohexylamine, ditetrahydrofurfurylamine, methylene amino acetonitrile, cyclohexylamine-formaldehyde (formed by crystallizing equimolecular quantities of formaldehyde and cyclohexylamine from solution in a suitable solvent), cyclohexylamino-acetonitrile, diphenyl guanidine, tetramethyl thiuram disulfide, dihydroxy diphenyl propane and mixtures of these compounds.

It is to be understood that the invention is not limited to the method of forming the rubber hydrohalide. An unpurified rubber hydrochloride, that is, a rubber hydrochloride which has not been washed in water to remove water soluble materials, may be used although in general the use of the purified rubber hydrochloride will be more satisfactory and give a better appearing product. Further, it is not essential that an age-resister be added to the rubber hydrochloride film. The coating may be applied to printer's blankets of different structures, the number of fabric layers in the blanket may be varied and the nature of the fabric employed may be varied all within the scope of this invention.

It is intended that the patent shall cover by suitable expression in the appended claims, whatever features of patentable novelty reside in the invention.

What I claim is:

1. A printer's blanket which comprises a layer of rubber and has a flexible coating of a stabilized rubber hydrohalide to protect the rubber.

2. A printer's blanket which comprises a layer of rubber and has a coating of a flexible nontacky, partially saturated rubber hydrochloride to protect the rubber.

3. A printer's blanket which comprises a felt base, contains a layer of rubber and has a flexible coating of a stabilized rubber hydrochloride to protect the rubber.

4. A printer's blanket which comprises a felt base, a fabric cemented to the felt base by vulcanized rubber and a flexible coating of rubber hydrochloride on the fabric.

5. A printer's blanket which comprises a felt base, at least one layer of cotton fabric, the felt base and the layer or layers of fabric being cemented together by vulcanized rubber and a flexible outer coating of a stabilized partially saturated rubber hydrochloride.

6. A printer's blanket which comprises at least two plies of fabric cemented together by vulcanized rubber and a flexible outer coating of a stabilized rubber hydrohalide.

7. A printer's blanket which comprises felt and is coated with a flexible stabilized rubber hydrochloride.

8. A printer's blanket characterized by a flexible oil-resistant surface composed essentially of rubber hydrohalide.

9. A rubber-containing printer's blanket in which the rubber is protected by a flexible layer composed essentially of rubber hydrochloride.

10. A printer's blanket which comprises a layer of felt and a flexible coating of stabilized rubber hydrohalide.

WILLIAM C. CALVERT.